Patented Apr. 29, 1952

2,594,356

UNITED STATES PATENT OFFICE 2,594,356

ISOLATION OF ALPHA-AMYLASE FROM MALT EXTRACT

Sigmund Schwimmer, Albany, and Arnold K. Balls, Berkeley, Calif., assignors to the United States of America as represented by the Secretary of Agriculture No Drawing. Application June 24, 1949, Serial No. 101,242

24 Claims. (Cl. 195—64)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the isolation of alpha-amylase from malt extract, the product obtained being substantially pure alpha-amylase in crystalline form.

Malt extract is of complex nature. It contains water, mineral salts, dextrins, sugars, inactive proteins, and a multitude of enzymes, including alpha and beta-amylase, phosphatase, proteinase, oxidases, and phosphorylase.

In view of this complex nature of the malt extract, it would ordinarily be considered difficult to isolate the alpha-amylase. However, according to the present invention, it is isolated in a simple and efficient manner and the product obtained is at least 95% pure, the sole impurity being inactive protein material, probably inactivated alpha-amylase.

In general, according to the invention, malt extract is heated to inactivate its beta-amylase content and to cause precipitation of the inactive proteins. The precipitate is removed, as by filtration, leaving a crude alpha-amylase dissolved in the remaining liquid phase. The crude alpha-amylase is then salted out as a precipitate and the precipitate is removed from the liquid phase and dissolved in aqueous alcohol. The aqueous alcohol solution of crude alpha-amylase is then contacted with a solid amylaceous adsorbent material which adsorbs substantially only the alpha-amylase. The alpha-amylase may then be eluted from the adsorbent material and crystallized from the eluate, to produce a crystalline alpha-amylase free from other enzymes.

The heating of the malt extract inactivates its beta-amylase content and causes precipitation of from ½ to ⅔ of the total inactive protein content. The heating temperature is preferably about 70° C., although the desired results may be satisfactorily obtained at temperatures from about 60° to about 75° C., the higher temperatures requiring the shorter periods of heating, generally from about 25 to 10 minutes being sufficient.

The salting out of the crude alpha-amylase from the remaining liquid phase is best accomplished by adjusting the liquid phase to a pH of from about 5 to about 7, preferably about 6, if necessary, in the usual manner, as by adding acids like hydrochloric or sulphuric or bases like ammonia or alkaline hydroxide as may be required, and by adding an inorganic salt. The purpose of adjusting the pH is to prevent inactivation of the alpha-amylase and to establish conditions under which the alpha-amylase has minimum solubility. Ammonium sulphate is preferred as the salt to be added, although other soluble salts of polyvalent anions, such as sodium sulphate, potassium sulphate, and magnesium sulphate may be used. The concentration of salt used is not critical, although the lower concentrations result in obtaining a purer alpha-amylase but in lower yield. With ammonium sulphate, enough of the salt to make the liquid about 0.4 to about 0.5 saturated with respect to the salt gives good results. The optimum concentration can readily be determined by using different concentrations on pilot samples and assaying the precipitates.

After the precipitate of crude alpha-amylase is formed by the salting out and is separated by filtration or centrifugation, it may be washed, if necessary, with a corresponding salt solution of lesser concentration than that used in the precipitation to remove occluded, undesired materials.

A small amount of a calcium salt, such as calcium sulphate or calcium chloride, is preferably added to the washing liquid to prevent inactivation of the alpha-amylase during washing, which tends to become inactivated in the absence of calcium ions. The concentration of the calcium salt is not critical—minute amounts are all that is necessary, and any calcium salt which is soluble to the extent of about 0.1 per cent or higher may be used to provide this required ion.

In the step of dissolving the precipitate of crude alpha-amylase in aqueous alcohol, it is preferable to use water containing sufficient alcohol to establish a concentration of about 40 percent thereof, a small amount of a calcium salt being also added for purposes indicated above. The purpose of the alcohol is to obtain maximum adsorption of alpha-amylase in succeeding procedure. The alcohol may be omitted, but lower yields will be obtained.

Many different kinds of solid amylaceous adsorbent materials may be used in the step of absorbing the alpha-amylase. On an economic basis starches such as wheat starch, corn starch, potato starch, pea starch, bean starch, taro starch, canna starch, and so forth are preferred, although they are not as efficient as other materials. These starches may be employed in their raw granular form, or partially degraded form. In general, if the starch is partially degraded, its efficiency will be greatly increased, that is, the same weight of the partially degraded starch will adsorb a greater amount of the alpha-amylase than the raw starch. Subjecting the raw starches to ball milling is a preferred manner of degrading them. Another manner is to solubilize the starch as in any of the ways well known in the art, as for example, by wetting the raw starch with hydrochloric acid, then heating and drying it.

Other adsorbent materials which may be used are glycogen, amylose, or amylopectin, these materials being more efficient than the starches but more costly.

If the adsorption is carried out by passing the alpha-amylase solution through a column containing the adsorbent, it is often advantageous to mix an inert, insoluble, solid material as a filter-aid with the adsorbent so that the liquid will flow through the column properly. For this purpose filter-aids, such as refined diatomaceous earths, sand, pumice, silicon carbide, and so forth, may be used. It is not essential, however, to use a column containing the adsorbent. The adsorbent may actually be mixed with the alpha-amylase solution, and then separated therefrom by filtration, decanting, or centrifugation.

The adsorption is usually conducted at room temperature as a matter of convenience. However, it is advantageous to carry out this step at a lower temperature, for example, at about 5° C., to minimize inactivation of the alpha-amylase.

In the elution of the alpha-amylase from the amylaceous adsorbent material, the solid amylaceous material containing adsorbed alpha-amylase may first be washed with aqueous alcohol, an alcohol concentration of about 40 percent being preferred, the solution also preferably containing a small amount of a calcium salt, to remove mechanically-occluded and/or loosely bound impurities.

The washed amylaceous material is then eluted with water preferably containing a calcium salt to dissolve and remove the adsorbed alpha-amylase. This elution is best accomplished by washing the amylaceous material with several portions of water and receiving each portion of effluent in a separate vessel. These effluents can be assayed and and only those containing substantial amounts of alpha-amylase combined. Generally, the first effluents will contain but little alpha-amylase and may be discarded.

In the crystallization of the substantially pure alpha-amylase from the eluate, the eluate preferably is first concentrated to remove the excess of water usually necessary in the elution treatment. This concentration is best effected by precipitating the alpha-amylase by adding an inorganic salt of a polyvalent anion. As in the initial precipitation of crude alpha-amylase, the pH should be adjusted in the range about 5 to about 7, preferably about 6. Any highly soluble inorganic salt of a polyvalent anion may be used, although ammonium sulphate is preferred. Higher concentrations can be used than in the initial precipitation, as there are practically no proteinous impurities present. Thus, with ammonium sulphate, it is preferred to use a concentration of about $2/3$ saturation.

The resulting precipitate may then be washed a dilute polyvalent anion salt solution, and then dissolved in as small a volume of water as possible (again a small amount of calcium being added to prevent inactivation). The alpha-amylase is then crystallized from this aqueous solution. This is best accomplished by adding a polyvalent anion inorganic salt to the solution in less concentration than that required to actually precipitate the enzyme but in such concentration as will promote crystallization. With ammonium sulphate, a concentration of about 0.26 saturated whereby crystallization is promoted without actual precipitation of an amorphous material gives good results. The crystallization is best carried out at room temperature or slightly higher, i. e., about 30–35° C.

The resulting crystals may be separated by centrifugation and recrystallized, if desired, by redissolving in water containing a little calcium salt and again adding a polyvalent anion salt to induce crystallization.

If desired, amylaceous material containing adsorbed alpha-amylase, as produced by the adsorbing of the alpha-amylase from the aqueous alcohol described above, may be washed to remove occluded impurities as described above, and then dried under vacuum. The resulting composition serves as a useful means for preserving and utilizing the alpha-amylase. Since the only impurity in such composition is the amylaceous material, and since it is completely free from undesired enzymes, it can be used in this form in most instances as a convenient source of alpha-amylase. This procedure is particularly applicable to the highly efficient adsorbents such as amylose, amylopectin, glycogen, dextrin, and so forth, since in such case the proportion of amylaceous substance to alpha-amylase will be low. Thus, for example, one gram of amylose may be contacted for one hour with a 40 per cent alcohol solution containing two grams $CaCl_2$ per liter, and 600 units of alpha-amylase, whereby all the enzyme will be adsorbed by the amylose. This material after washing with 40 per cent alcohol containing two grams $CaCl_2$ per liter is then dried under vacuum and serves as useful source of alpha-amylase free from all other enzymes.

The following examples exhibit the invention in detail.

The assays for alpha-amylase activity were carried out by measuring the rate of change in the intensity of the color formed when iodine is added to a portion of reaction mixture containing starch and the material to be assayed. The unit by which the activity is measured is that amount of alpha-amylase which gives 50 per cent transmission at 660 m$\mu$ in ten minutes under the conditions of the assay technique. One such unit will liberate an equivalent of 150 milligrams of maltose from one gram of starch under the same conditions. The specific activity is expressed as the units (as above described) per milligram of protein nitrogen, abbreviated as "units per mg. PN."

EXAMPLE I

Two liters of commercial malt syrup (total activity 28,000 units, specific activity 6 units per mg. PN) was heated to 70° C. for 16 minutes, then filtered with the aid of a refined diatomaceous earth filter-aid to remove suspended matter.

Sufficient ammonium sulphate was added to the clear filtrate to make it 0.43 to 0.50 saturated with respect to ammonium sulphate and pH adjusted to 5.6 to 6.0 with ammonia. The precipitate of crude alpha-amylase was separated by filtration and washed with 5 or 6 times its volume of ⅓ saturated ammonium sulphate solution (pH 5.6 to 6.0) containing two grams of calcium sulphate per liter.

The washed precipitate thus obtained was dissolved in sufficient water to make 50 ml., then an equal volume of 80 per cent ethanol containing 5 grams of calcium chloride per liter was added. Insoluble material was removed by filtration. The filtrate thus obtained was poured through a column containing a mixture of 30 grams raw wheat starch, and 30 grams refined diatomaceous earth as a filter-aid. The column was then washed with 40 per cent alcohol containing 5 grams $CaCl_2$ per liter until the effluent was colorless.

The alpha-amylase was then eluted from the adsorbent by pouring 50 ml. portions of saturated calcium sulphate solution through the column. The effluents were kept separate and assayed and those containing much enzyme were combined. The enzyme was precipitated from the combined eluates by adding ammonium sulphate to give a ⅔ solution of the salt (pH 6.0). The precipitate was filtered off, washed with half saturated ammonium sulphate at pH 6.0, then dissolved in 15–20 ml. of half-saturated calcium sulphate solution. The pH of the solution was adjusted to 5.9–6 with ammonia and saturated ammonium sulphate solution added to give a .26 saturation. The solution was allowed to stand, whereupon crystals of alpha-amylase were formed. These crystals had a total activity of 14,000 units and a specific activity of 350 units per mg. PN. The crystals were recrystallized 3 times, each time by dissolving in half-saturated calcium sulphate solutions, adding saturated ammonium sulphate solution as before and permitting the crystals to form. The final product had a total activity of 8,000 units and a specific activity of 390 units per mg. PN. Other properties of the crystalline material are listed below.

Content of alpha-amylase—95 to 97 per cent.
Nitrogen content (Kjeldahl)—13.4 per cent.
Hexagonal prisms usually about 13μ in length, capped by pyramids. Sometimes longer crystals (about 30μ) are obtained.
Molecular weight by osmotic pressure measurements—59,500±900.
Turnover number—19,000—meaning that 19,000 glycosidic bonds are hydrolyzed per minute per molecule of enzyme when the total number of glycosidic bonds per molecule of enzyme in the digestion mixture is $4 \times 10^6$.

EXAMPLE II

A solution containing 600 units of alpha-amylase in 40 percent alcohol containing 5 grams of calcium chloride per liter was contacted with 34 mg. of glycogen for a period of two minutes. The glycogen was separated from the solution, and it was found that it had adsorbed 32.4 percent of the alpha-amylase. A series of similar experiments was conducted, using amylose as the adsorbent material, and it was found that it required 65 mg. of amylose to adsorb 32.4 percent of the alpha-amylase. Therefore, if amylose is given an arbitrary adsorption efficiency of 100 percent, then glycogen has an adsorption efficiency of $^{65}/_{34} \times 100$ or 191 percent. The data for adsorption on amylose is set forth in the following table:

Table 1

| Weight of amylose, grams | Per cent of alpha-amylose adsorbed in 2 minutes |
|---|---|
| 0.03 | 17 |
| 0.125 | 49 |
| 0.25 | 71 |
| 0.5 | 85 |
| 1. | 94 |
| 4. | 98 |

EXAMPLE III

Solutions of alpha-amylase in 40 percent alcohol containing 5 g. $CaCl_2$ per liter, were contacted for two minutes with various adsorbents and the percentages of alpha-amylase adsorbed determined. From these results the efficiency of the various adsorbents was determined on a relative basis of 100 percent for amylose. The results are set forth in the following table:

Table 2

| Adsorbent | Weight of adsorbent, grams | Per cent of alpha-amylase adsorbed | Weight of amylose required to obtain equal percentage of adsorption grams [1] | Efficiency, per cent |
|---|---|---|---|---|
| Glycogen | 0.034 | 32.4 | 0.65 | 191.0 |
| Corn starch, raw granules | 4.0 | 36.1 | 0.075 | 1.9 |
| Corn starch, defatted | 4.0 | 45.1 | 0.108 | 2.7 |
| Wheat starch, raw granules | 4.0 | 42.4 | 0.098 | 2.5 |
| Wheat starch, ball milled | 1.0 | 71.4 | 0.26 | 26.0 |
| Wrinkled pea starch, raw granules | 4.0 | 94.5 | 4.0 | 35.0 |
| Waxy maize starch, raw granules | 4.0 | 62.4 | 0.2 | 6.3 |
| Potato starch, raw granules | 4.0 | 15.8 | 0.27 | 0.7 |
| Potato starch, soluble | 4.0 | 25.2 | 0.46 | 1.2 |
| Canna starch, raw granules | 4.0 | 13.2 | 0.024 | 0.6 |
| Taro root starch, raw granules | 4.0 | 56.8 | 0.165 | 4.1 |
| Amylopectin | 4.0 | 95.0 | 1.2 | 30.0 |
| Amylopectin, 0.2 g | 0.25 | 43.0 | 0.1 | 40.0 |
| Amylose, 0.05 g | | | | |
| Dextrin | 0.25 | 21.0 | 0.037 | 15.0 |

[1] These values obtained from the data in Table 1.

The pure alpha-amylase prepared in accordance with this invention is useful for many purposes. It can be used as any amylase is fermentation procedures, such as manufacture of alcohol or beer, to hydrolyze starchy raw materials into fermentable materials, particularly maltose. It can be used in the clarification of fruit juices, beer, and other liquids to hydrolyze the starch content thereof. Since the alpha-amylase is free from proteinases and other extraneous enzymes, this clarification is accomplished without formation of bad odors or off-flavors. This specific action of alpha-amylase can also be utilized for the preparation of foodstuffs containing maltose by treatment of legumes or cereals therewith. It can be used to desize starched textile materials, or remove starch from tissues, as is often desirable in the microscopic examination of the tissues. Since the alpha-amylase of this invention will not attack proteins, it can be used for the isolation of proteins from natural sources thereof. For example, wheat flour or partly purified gluten can be treated with the pure alpha-amylase whereby the starch content of the raw material will be hydrolyzed and thus made easily separable from the proteinous material. Because of its stepwise action in hydrolyzing starch, the pure alpha-amylase can be used for preparing dextrins of any desired molecular weight by carrying out the hydrolysis under controlled conditions. Such control is not possible with beta-amylase which produces only a high-molecular weight or "limit" dextrin. The pure alpha-amylase can serve as a standard to measure potency of crude amylase preparations.

We claim:

1. A process for isolating alpha-amylase which comprises contacting a partially-purified solution of malt alpha-amylase with a solid amylaceous adsorbent material, eluting the alpha-amylase from the adsorbent material and crystallizing it from the eluate.

2. The process in accordance with claim 1, wherein the adsorbent material is a starch.

3. The process in accordance with claim 1, wherein the adsorbent material is a partially-degraded starch.

4. The process in accordance with claim 1, wherein the adsorbent material is a solubilized starch.

5. The process in accordance with claim 1, wherein the adsorbent material is amylose.

6. A process for isolating alpha-amylase comprising heating malt extract to inactivate its beta-amylase content, removing precipitated material from the extract, salting out a crude alpha-amylase precipitate from the remaining liquid phase, dissolving the alpha-amylase precipitate in aqueous alcohol, contacting this solution with a solid amylaceous adsorbent material, eluting the alpha-amylase from the adsorbent material, and crystallizing the alpha-amylase from the eluate.

7. The process in accordance with claim 6, wherein the amylaceous adsorbent material is a starch.

8. The process in accordance with claim 6, wherein the amylaceous adsorbent material is a partially-degraded starch.

9. The process in accordance with claim 6, wherein the amylaceous adsorbent material is a partially-degraded starch prepared by ball-milling raw starch.

10. The process in accordance with claim 6, wherein the amylaceous adsorbent material is a solubilized starch.

11. The process in accordance with claim 6, wherein the amylaceous adsorbent material is amylose.

12. Process which comprises contacting a partially-purified solution of malt alpha-amylase with a solid amylaceous adsorbent material, washing the adsorbent material to remove mechanically-occluded and loosely bound materials, then drying the adsorbent material thus to produce a composition containing alpha-amylase adsorbed on the amylaceous material and free from other enzymes.

13. Process in accordance with claim 12, wherein the solid amylaceous adsorbent material is a starch.

14. Process in accordance with claim 12, wherein the solid amylaceous adsorbent material is a partially-degraded starch.

15. Process in accordance with claim 12, wherein the solid amylaceous adsorbent material is amylose.

16. Process in accordance with claim 12, wherein the amylaceous adsorbent material is amylopectin.

17. Process in accordance with claim 12, wherein the solid amylaceous adsorbent material is glycogen.

18. Crystalline malt alpha-amylase free from other enzymes.

19. A composition of matter containing malt alpha-amylase adsorbed on an amylaceous substance and being free from other enzymes.

20. A composition of matter containing malt alpha-amylase adsorbed on a starch and being free from other enzymes.

21. A composition of matter containing malt alpha-amylase adsorbed on a partially-degraded starch and being free from other enzymes.

22. A composition of matter containing malt alpha-amylase adsorbed on amylose and being free from other enzymes.

23. A composition of matter containing malt alpha-amylase adsorbed on amylopectin and being free from other enzymes.

24. A composition of matter containing malt alpha-amylase adsorbed on glycogen and being free from other enzymes.

SIGMUND SCHWIMMER.
ARNOLD K. BALLS.

REFERENCES CITED

The following references are of record in the file of this patent:

UNITED STATES PATENTS

| Number | Name | Date |
|---|---|---|
| 1,444,250 | Kern et al. | Feb. 6, 1923 |
| 1,590,663 | Altgelt et al. | June 29, 1926 |